US011140167B1

(12) United States Patent
Lin et al.

(10) Patent No.: US 11,140,167 B1
(45) Date of Patent: Oct. 5, 2021

(54) SYSTEM, METHOD, AND COMPUTER PROGRAM FOR AUTOMATICALLY CLASSIFYING USER ACCOUNTS IN A COMPUTER NETWORK USING KEYS FROM AN IDENTITY MANAGEMENT SYSTEM

(71) Applicant: Exabeam, Inc., San Mateo, CA (US)

(72) Inventors: Derek Lin, San Mateo, CA (US); Barry Steiman, San Ramon, CA (US); Domingo Mihovilovic, Menlo Park, CA (US); Sylvain Gil, San Francisco, CA (US)

(73) Assignee: Exabeam, Inc., Foster City, CA (US)

( * ) Notice: Subject to any disclaimer, the term of this patent is extended or adjusted under 35 U.S.C. 154(b) by 1097 days.

(21) Appl. No.: 15/058,034

(22) Filed: Mar. 1, 2016

(51) Int. Cl.
*H04L 29/06* (2006.01)
*G06N 20/00* (2019.01)

(52) U.S. Cl.
CPC ........... *H04L 63/102* (2013.01); *G06N 20/00* (2019.01)

(58) Field of Classification Search
CPC .............................. H03L 63/102; G06N 20/00
See application file for complete search history.

(56) References Cited

U.S. PATENT DOCUMENTS

| | | | |
|---|---|---|---|
| 5,941,947 A | 8/1999 | Brown et al. |
| 6,223,985 B1 | 5/2001 | DeLude |
| 6,594,481 B1 | 7/2003 | Johnson et al. |
| 7,668,776 B1 | 2/2010 | Ahles |
| 8,326,788 B2 | 12/2012 | Allen et al. |
| 8,443,443 B2 | 5/2013 | Nordstrom et al. |
| 8,479,302 B1 | 7/2013 | Lin |
| 8,539,088 B2 | 9/2013 | Zheng |
| 8,583,781 B2 | 11/2013 | Raleigh |
| 8,606,913 B2 | 12/2013 | Lin |
| 8,676,273 B1 | 3/2014 | Fujisake |
| 8,881,289 B2 | 11/2014 | Basavapatna et al. |

(Continued)

OTHER PUBLICATIONS

Wang et al. ("Don't Follow Me Spam Detection in Twitter", International Conference on Security and Cryptography (SECRYPT), 2010, pp. 1-10) (Year: 2010).*

(Continued)

*Primary Examiner* — Kakali Chaki
*Assistant Examiner* — Robert Lewis Kulp
(74) *Attorney, Agent, or Firm* — Lessani Law Group, PC

(57) ABSTRACT

The present disclosure describes a system, method, and computer program for automatically classifying user accounts within an entity's computer network, using machine-based-learning modeling and keys from an identity management system. A system uses supervised machine learning to create a statistical model that maps individual keys or sets of keys to a probability of being associated with a first type of user account (e.g., a service account). To classify an unclassified user account, the system identifies identity management keys associated with the unclassified user account. The system creates an N-dimensional vector from the keys (where N=the number of keys), and uses the vector and the statistical model to calculate a probability that the unclassified user account is the first type of user account. In response to the probability exceeding a first threshold, the system classifies the unclassified user account as the first type of user account.

12 Claims, 7 Drawing Sheets

(56) References Cited

U.S. PATENT DOCUMENTS

| | | |
|---|---|---|
| 9,055,093 B2 | 6/2015 | Borders |
| 9,081,958 B2 | 7/2015 | Ramzan et al. |
| 9,185,095 B1 | 11/2015 | Moritz et al. |
| 9,189,623 B1 | 11/2015 | Lin et al. |
| 9,680,938 B1 | 6/2017 | Gil et al. |
| 9,692,765 B2 | 6/2017 | Choi et al. |
| 9,760,240 B2 | 9/2017 | Maheshwari et al. |
| 9,779,253 B2 | 10/2017 | Mahaffey et al. |
| 9,843,596 B1 | 12/2017 | Averbuch et al. |
| 9,898,604 B2 | 2/2018 | Fang et al. |
| 10,095,871 B2 | 10/2018 | Gil et al. |
| 10,419,470 B1 | 9/2019 | Segev et al. |
| 10,474,828 B2 | 11/2019 | Gil et al. |
| 10,496,815 B1 | 12/2019 | Steiman et al. |
| 10,803,183 B2 | 10/2020 | Gil et al. |
| 2002/0107926 A1 | 8/2002 | Lee |
| 2003/0147512 A1 | 8/2003 | Abburi |
| 2004/0073569 A1 | 4/2004 | Knott et al. |
| 2006/0090198 A1 | 4/2006 | Aaron |
| 2007/0156771 A1 | 7/2007 | Hurley et al. |
| 2007/0282778 A1 | 12/2007 | Chan et al. |
| 2008/0040802 A1 | 2/2008 | Pierson et al. |
| 2008/0170690 A1 | 7/2008 | Tysowski |
| 2008/0301780 A1 | 12/2008 | Ellison et al. |
| 2009/0144095 A1 | 6/2009 | Shahi et al. |
| 2009/0171752 A1 | 7/2009 | Galvin et al. |
| 2009/0293121 A1 | 11/2009 | Bigus et al. |
| 2010/0125911 A1 | 5/2010 | Bhaskaran |
| 2010/0269175 A1 | 10/2010 | Stolfo et al. |
| 2012/0278021 A1 | 11/2012 | Lin et al. |
| 2012/0316835 A1 | 12/2012 | Maeda et al. |
| 2012/0316981 A1 | 12/2012 | Hoover et al. |
| 2013/0080631 A1 | 3/2013 | Lin |
| 2013/0117554 A1 | 5/2013 | Ylonen |
| 2013/0197998 A1 | 8/2013 | Buhrmann et al. |
| 2013/0227643 A1 | 8/2013 | Mccoog et al. |
| 2013/0305357 A1 | 11/2013 | Ayyagar et al. |
| 2013/0340028 A1 | 12/2013 | Rajagopal et al. |
| 2014/0315519 A1 | 10/2014 | Nielsen |
| 2015/0046969 A1 | 2/2015 | Abuelsaad et al. |
| 2015/0121503 A1 | 4/2015 | Xiong |
| 2015/0205944 A1 | 7/2015 | Turgeman |
| 2015/0339477 A1 | 11/2015 | Abrams et al. |
| 2015/0341379 A1 | 11/2015 | Lefebvre et al. |
| 2016/0005044 A1 | 1/2016 | Moss et al. |
| 2016/0021117 A1 | 1/2016 | Harmon et al. |
| 2016/0063397 A1* | 3/2016 | Ylipaavalniemi ... G06K 9/6262 706/12 |
| 2016/0306965 A1 | 10/2016 | Iyer et al. |
| 2016/0364427 A1 | 12/2016 | Wedgeworth, III |
| 2017/0024135 A1 | 1/2017 | Christodorescu et al. |
| 2017/0155652 A1 | 6/2017 | Most et al. |
| 2017/0161451 A1 | 6/2017 | Weinstein et al. |
| 2017/0213025 A1 | 7/2017 | Srivastav et al. |
| 2017/0236081 A1 | 8/2017 | Smith et al. |
| 2017/0318034 A1 | 11/2017 | Holland et al. |
| 2018/0048530 A1 | 2/2018 | Nikitaki et al. |
| 2018/0234443 A1 | 8/2018 | Wolkov et al. |
| 2019/0034641 A1 | 1/2019 | Gil et al. |
| 2020/0021607 A1 | 1/2020 | Muddu et al. |
| 2020/0082098 A1 | 3/2020 | Gil et al. |

OTHER PUBLICATIONS

Freeman et al. ("Who are you? A Statistical Approach to Measuring User Authenticity", NDSS 16, Feb. 21-24, 2016, San Diego, pp. 1-15) (Year: 2016).*

Datum Box Blog ("Machine Learning Tutorial: The Naïve Bayes Text Classifier", DatumBox Machine Learning Blog and Software Development News, Archive.Org Jan. 21, 2014) (Year: 2014).*

Malik et al. ("Automatic Training Data Cleaning for Text Classification", 1011 11th IEEE International Conference on Data Mining Workshops, 2011, pp. 442-449) (Year: 2011).*

Poh et al. ("EER of Fixed and Trainable Fusion Classifiers: A theoretical Study with Application to Biometric Authentication Tasks", Multiple Classifier Systems. MCS 2005. Lecture Notes in Computer Science, vol. 3541. Springer, Berlin, Heidelberg., pp. 1-11) (Year : 2005).*

Ioannidis, Yannis, "The History of Histograms (abridged)", Proceedings of the 29th VLDB Conference (2003), pp. 1-12.

Cooley, R , et al., "Web Mining: Information and Pattern Discovery on the World Wide Web", Proceedings Ninth IEEE International Conference on Tools with Artificial Intelligence, Nov. 3-8, 1997, pp. 558-567.

* cited by examiner

Naïve Bayes Model: A Collection of P(C | word)

| Words indicative of user accounts | | Words with no differentiability | | Words indicative of service accounts | |
|---|---|---|---|---|---|
| word | P(C \| word) | | | | |
| c | 0.0300961 | msexchbypassaudit | 0.43951357 | otherpager | 0.88520197 |
| employeetype | 0.03015495 | msexchaddressbookflags | 0.43951357 | msexchrequireauthtosendto | 0.88520197 |
| employeenumber | 0.03015495 | proxyaddresses | 0.44372889 | msexchmasteraccountsid | 0.88520197 |
| division | 0.03237026 | mailnickname | 0.44715982 | msexchassistantname | 0.88520197 |
| co | 0.03271359 | wwwhomepage | 0.44802585 | middlename | 0.88520197 |
| thumbnailphoto | 0.03349515 | internetencoding | 0.44933122 | jpegphoto | 0.88520197 |
| postalcode | 0.04681505 | lastlogoff | 0.45462964 | msexchmailboxsecuritydescript | |
| postaladdress | 0.04812999 | badpasswordtime | 0.46820959 | or | 0.91135748 |
| streetaddress | 0.05116384 | mail | 0.4743721 | msexchmailboxguid | 0.91135748 |
| manager | 0.06146096 | extensionattribute9 | 0.47566309 | mdbusedefaults | 0.91135748 |
| mobile | 0.06414516 | extensionattribute8 | 0.47566309 | userparameters | 0.92042288 |
| st | 0.06902592 | extensionattribute7 | 0.47566309 | admincount | 0.92271748 |
| physicaldeliveryofficename | 0.07891593 | extensionattribute6 | 0.47566309 | msexchhomeservername | 0.93910571 |
| extensionattribute10 | 0.08741489 | extensionattribute5 | 0.47566309 | description | 0.95434883 |
| title | 0.10134527 | extensionattribute4 | 0.47566309 | msds-supportedencryptiontypes | 0.9563611 |
| directreports | 0.10461066 | msexchpoliciesincluded | 0.48285271 | userworkstations | 0.95856271 |
| l | 0.10604938 | mstsmanagingls | 0.51080899 | publicdelegates | 0.95856271 |
| managedobjects | 0.10904889 | mstslicenseversion | 0.51080899 | msnpallowdialin | 0.95856271 |
| department | 0.14468627 | mstsexpiredate | 0.51080899 | showinadvancedviewonly | 0.96859672 |
| homedirectory | 0.17392096 | msexchumdtmfmap | 0.51489902 | msexchrmscomputeraccountslin | |
| homedrive | 0.17441269 | msexchrecipientdisplaytype | 0.51489902 | k | 0.96859672 |
| company | 0.24147149 | msexchuseraccountcontrol | 0.53762837 | info | 0.9729616 |
| | | | | iscriticalsystemobject | 0.98404788 |
| | | | | serviceprincipalname | 0.98719746 |

FIG. 6

SYSTEM, METHOD, AND COMPUTER PROGRAM FOR AUTOMATICALLY CLASSIFYING USER ACCOUNTS IN A COMPUTER NETWORK USING KEYS FROM AN IDENTITY MANAGEMENT SYSTEM

BACKGROUND OF THE INVENTION

1. Field of the Invention

This invention relates generally to security analytics in computer networks, and, more specifically, to classifying user accounts as human accounts or service accounts based on keys from an identity management system.

2. Description of the Background Art

For user behavior modeling in IT network security analytics, it is critical to leverage contextual information to improve alert accuracy. For example, contextual information can be used to construct and evaluate context-specific rules. Some contextual information is factual, and some is derived statistically. An example of factual contextual information is the geolocation from which a current VPN event comes. An example of statistically-derived contextual information is a conclusion that an asset (e.g., a laptop or phone) is likely to belong to an executive based on historical data.

Whether an account is a human user account or a service account is useful contextual information in network security analytics. For example, if during a login session, an account is behaving as a service account, but it is known that it is a human user account, the login session may be a good candidate for an alert.

An identity management system (e.g., Open LDAP, Active Directory) maintains a directory of all accounts on an enterprise network. Each account is described by a collection of key-value pairs. "Keys" are akin to fields, but are dynamic in that they some can be specified by the enterprise. The types of keys used to describe an account are not always consistent across departments and certainly not across enterprises.

Currently, classifying an account as a human user account or a service account is done manually and requires significant human effort. An analyst reads the organization unit key from an identity management system and decides whether the key value pertains to a service account. This environment-specific effort is laborious and at best finds a subset of service accounts, leaving potentially other service accounts undiscovered. Furthermore, the process needs to be repeated as new accounts are added to the network. It would be desirable to leverage the manually-found service accounts to construct an automated classifier to probabilistically infer, using textual readout of keys from an identity management system, the status of new accounts or existing, unclassified accounts.

SUMMARY OF THE DISCLOSURE

The present disclosure describes a system, method, and computer program for automatically classifying user accounts within an entity's computer network, using machine-based-learning modeling and keys from an identity management system. The method is performed by a computer system (the "system").

Using machine-learning-based modeling, the system creates a statistical model that maps individual keys or sets of keys to a probability of being associated with a first type of user account. The model is trained using a set of inputs and a target variable. The inputs are keys from an identity management data structure associated with user accounts manually classified as the first type of user account or a second type of user account, and the target variable is whether the user account is the first type of user account.

Once the statistical model is created, the system uses the model to automatically determining whether an unclassified user account is the first type of user account. To classify an unclassified user account, the system identifies identity management keys associated with the unclassified user account. The system then creates an N-dimensional vector of the keys, wherein N is the number of the keys associated with the unclassified user account.

The system inputs the N-dimensional vector into the statistical model to calculate a probability that the unclassified user account is the first type of user account. In response to the probability exceeding a first threshold, the system classifies the unclassified user account as the first type of user account.

In certain embodiments, there is one threshold (i.e., the first threshold). If the probability is below the first threshold, the account is classified as the second type of account.

In certain embodiments, there are two thresholds. If the probability is below a lower, second threshold, the account is classified as the second type of account. If the probability is between the first and second thresholds, the system concludes that the classification of the user account is undetermined.

In certain embodiments, the first type of user account is a service user account and the second type of user account is a human user account. In certain embodiments, the first type of user account is a human user account and the second type of account is a service user account.

In certain embodiments, the data model is constructed using Bernoulli Naïve Bayes modeling.

In certain embodiments, the keys for the unclassified user account are identified by parsing an output text file from the identity management system that corresponds to the unclassified user account.

In certain embodiments, the system performs the automated classification steps on each of the manually-classified user accounts used to train the statistical model in order to identify any mismatches between the automated classifications and the manual classifications.

BRIEF DESCRIPTION OF THE DRAWINGS

FIG. 6 is a table that illustrates example key-to-probability mappings in a Naïve Bayes statistical model.

DETAILED DESCRIPTION OF THE PREFERRED EMBODIMENTS

Figure 1A:
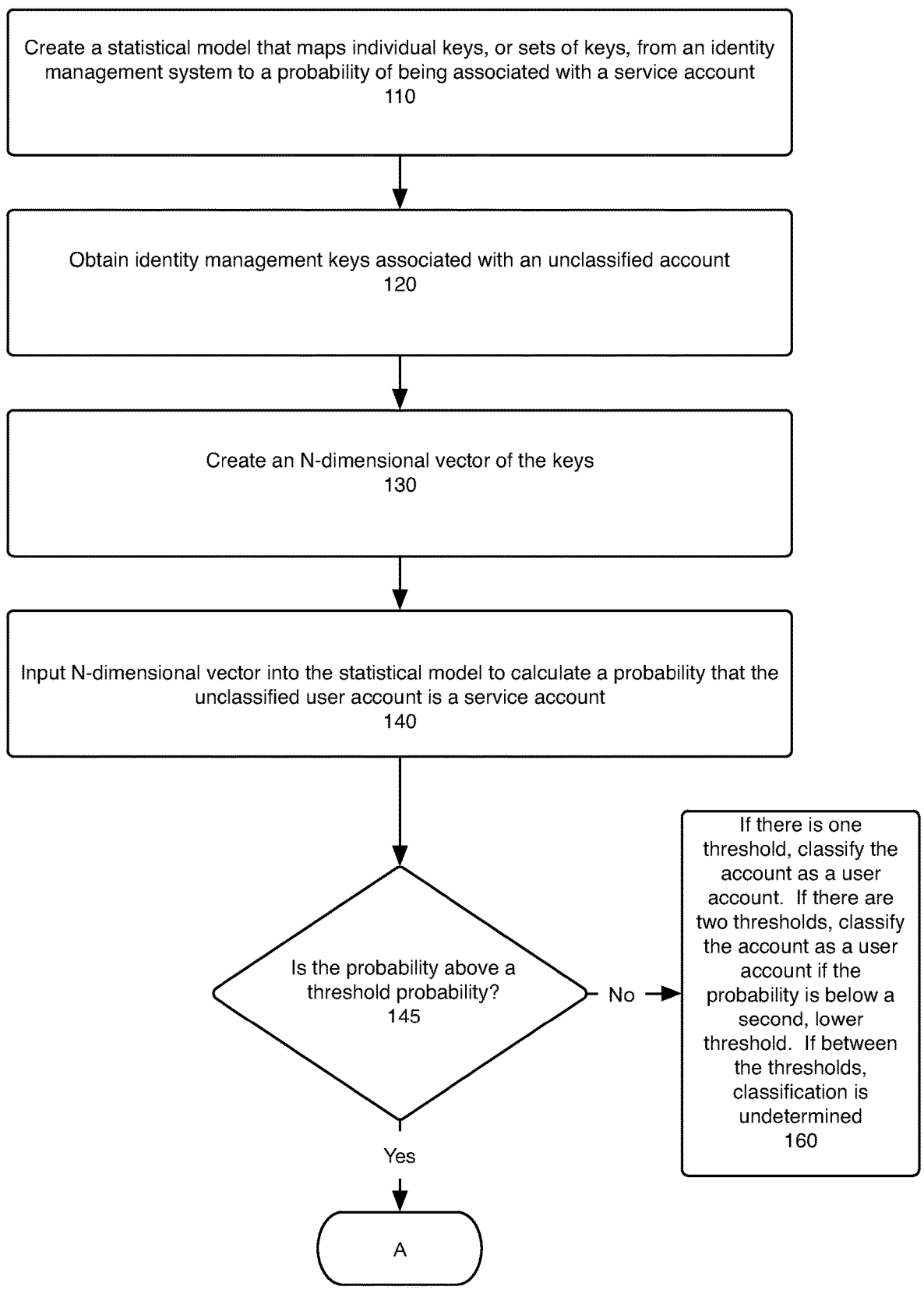
FIGS. 1A-1B are flowcharts that illustrate a method, according to one embodiment, for automatically classifying user accounts as human user accounts or service accounts.
Figure 1B:
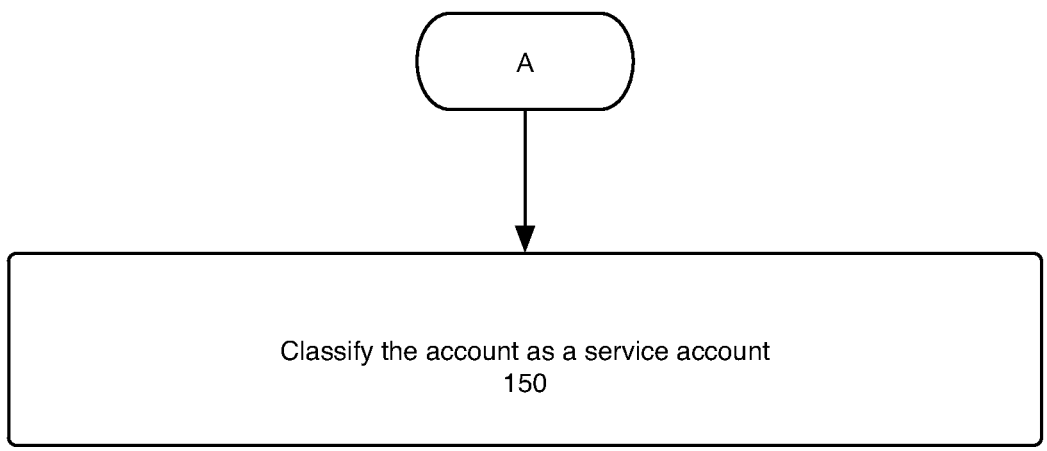

FIGS. 1A-1B illustrates a method for automatically classifying user accounts as human user accounts or service accounts within an entity's network (e.g., an enterprise's IT network). The method uses machine-learning-based modeling and keys from an identity management system to classify accounts. The method is performed by a computer system (the "system"). An entity may be an enterprise, a corporation, a government agency, or any other type of organization.

Referring to FIG. 1, the system creates a statistical model that maps individual keys, or sets of keys, from an identity management system to a probability of being associated with a service account in the entity's IT network (step 110).

The model is created using a supervised learning algorithm. The preferred algorithm is the Bernoulli Naïve Bayes algorithm, but other supervised learning algorithms, such as logistical regression algorithm, could be used. The model is trained using a set of inputs and a target variable. The inputs used to train the statistical model are identity management keys associated with manually-classified accounts. In the embodiment illustrated in FIG. 1, the target variable for the model is whether an account is a service account. In other words, the model maps identity management keys to a probability that an account is a service account. However, those skilled in the art will appreciate that the target variable could be whether the account is a human user account.

The system obtains the keys for the training data from an identity management system. Examples of identity management systems are MICROSOFT ACTIVE DIRECTORY and OPEN LDAP. In one embodiment, the system parses an LDIF text file from identity management system to find the keys associated with training accounts. A human then provides a list of accounts known as service accounts based on the knowledge of enterprise's account naming convention or IT records. Alternatively, a human may review the keys to manually classify service accounts from the keys. For example, an administrator may review the keys for a set of accounts to identify the accounts with a key or set of keys known to be specific only to service accounts at an entity. The identified accounts within the training set are manually classified as service accounts, and the other accounts within the set are manually classified, by default, as human user accounts. Whether via known service account listing or manual review effort, the administrator likely will find only a subset of the service accounts this way, but, if the identified set of service accounts is large enough, the model will be sufficiently reliable. Furthermore, as described below, an iterative process may be used to improve the reliability of the model. Using a supervised learning algorithm, the system leverages the manually classified accounts to "learn" and build the statistical model.

The table in FIG. 6 illustrates example key-to-probability mappings in a Naïve Bayes statistical model created as described above. Specifically, the table maps example individual keys to a probability that the key is associated with a service account. The keys are examples of keys associated with one entity, and keys may vary across entities. In "P(C|word)" in FIG. 6, C=Service Account.

Once the model is created, it can be used to automatically determine whether an unclassified account is a service account or human user account. It also can be used to reclassify, in an automated manner, the manually-classified training data. Referring to FIG. 1, the system obtains from, an identity management system, the identity management keys associated with the unclassified account (step 120). In one embodiment, the system parses an LDIF text file from the identity management system to obtain the textual keys. The system creates an N-dimensional vector of the keys, wherein N is the number of keys associated with the unclassified account (step 130). The system inputs the N-dimensional vector into the statistical model to calculate a probability that the unclassified user account is a service account (step 140).

Figure 2:
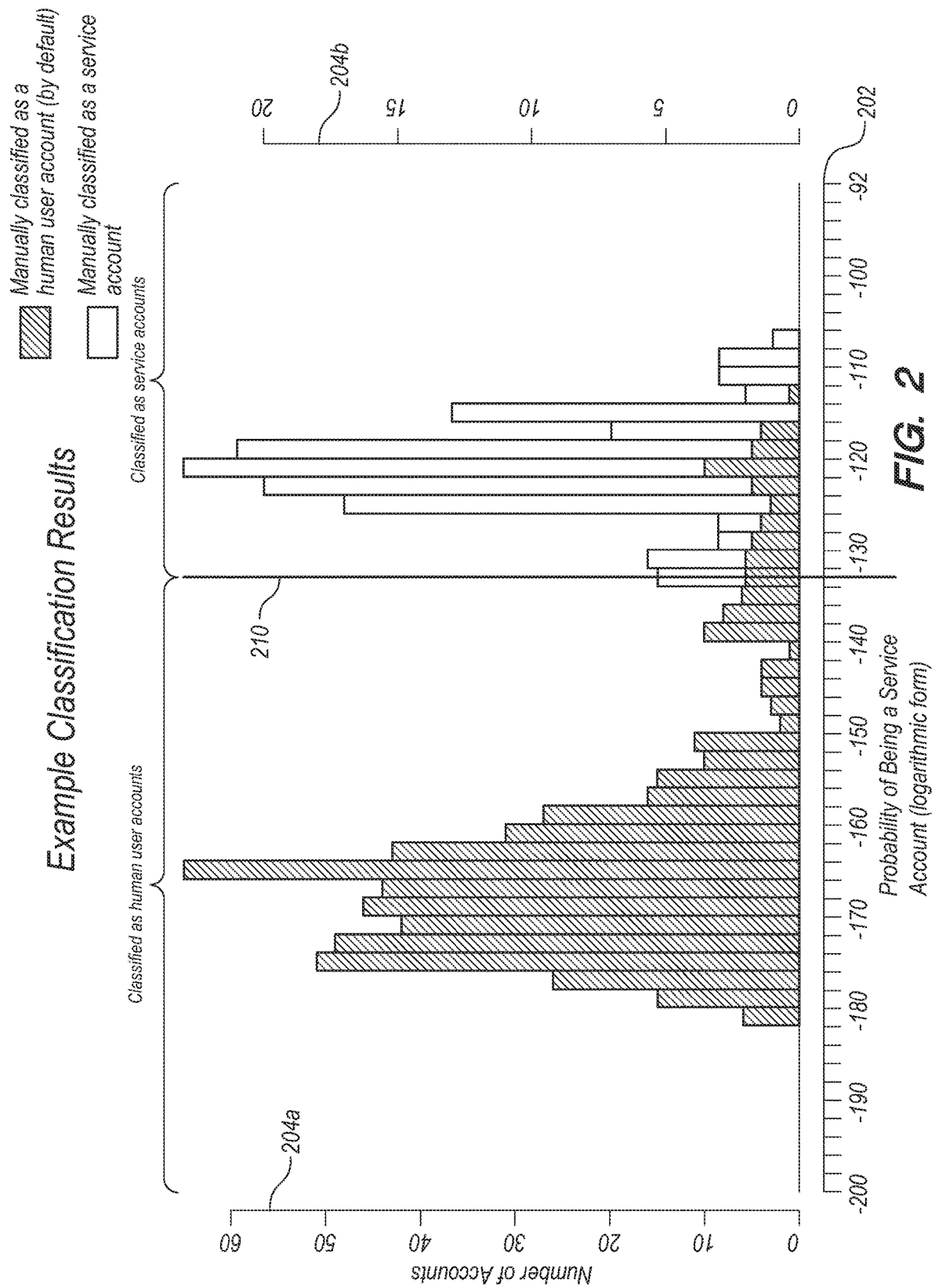
FIGS. 2 and 3 are graphs that illustrate example classification results.
Figure 3:
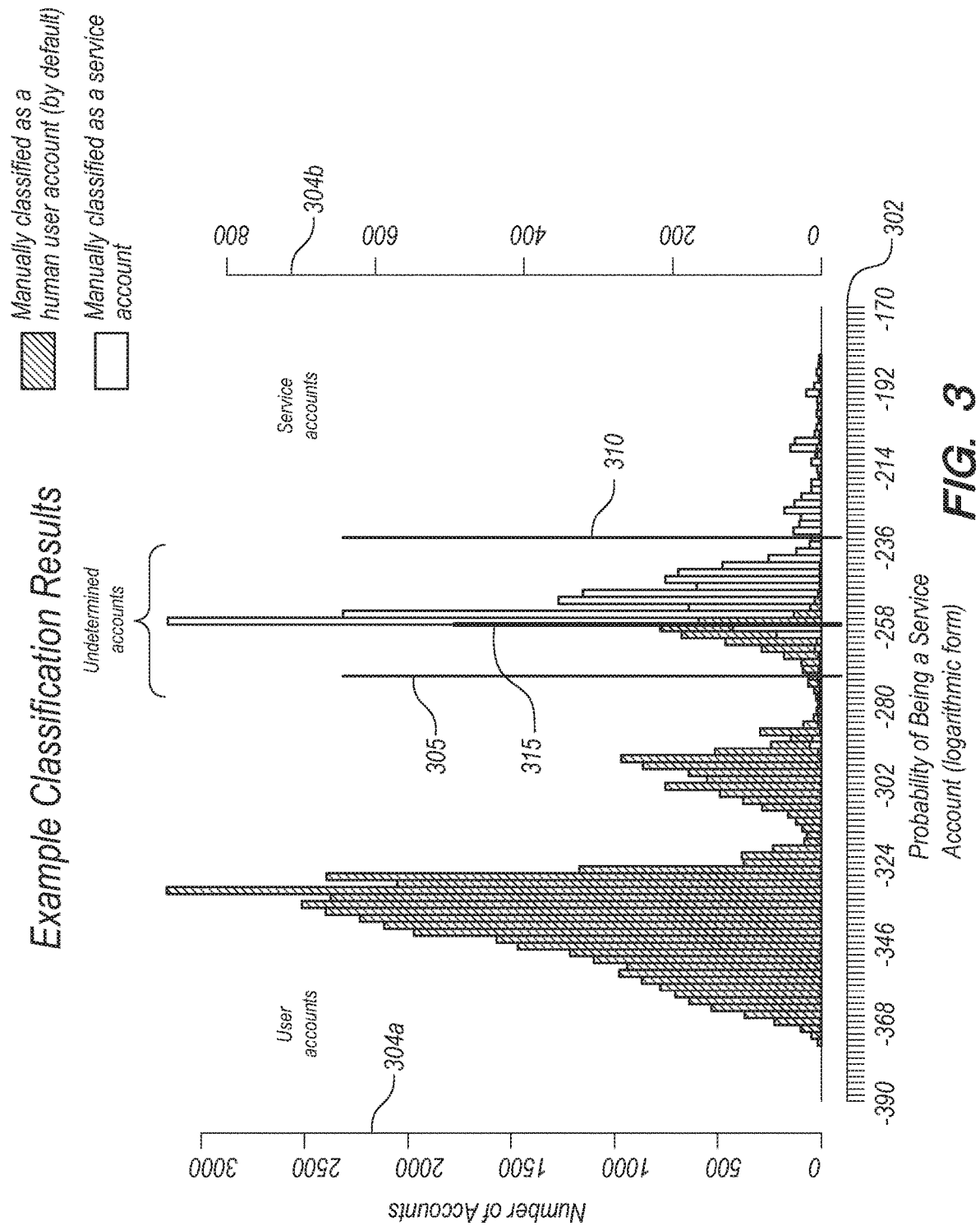

FIGS. 2 and 3 are graphs that illustrate example classification results. In each graph, the x-axis 202, 302 represents the probability scores (in logarithmic form (base 10)), and the y-axis 204a, 204b, 304a, 304b represents the number of accounts (204a and 304a are the y-axis for human user accounts, and 204b and 304b are the y-axis for service accounts). The bars represent the automated classification results. In these examples, the accounts classified are the original training accounts, and the fill in the bar represents whether the bar was manually classified as a service account or a human user account (hash mark=manually classified as human user account).

Referring again to FIG. 1, if the probability calculated in step 140 is above a threshold probability, the system classifies the account as a service account (step 145, 150). A threshold can be chosen based on desired tradeoff between false positive rate and false negative rate of the classifier. An example threshold is the probability where the false positive rate equals to the false negative rate. In one embodiment, if the probability is below the threshold, the account is classified as a human user account (step 160). This embodiment is illustrated in FIG. 2 in which accounts with scores above probability threshold 210 are classified as service accounts, and accounts with scores below the threshold 210 are classified as human user accounts.

In an alternate embodiment, there are two probability thresholds, an upper threshold and a lower threshold, as illustrated in FIG. 3. Accounts with probabilities above an upper threshold 310 are classified as service accounts, and accounts with probabilities below a lower threshold 305 are classified as human user accounts (step 160). The system concludes that accounts with probabilities between the two thresholds 305, 310 are undetermined. Line 315 represents the location of the EER rate, which is discussed below.

In FIGS. 1-3, the positive class is the service account in that the model predicts the probability that an account is a service account. However, those skilled in the art will appreciate, that the system could be easily configured such that the positive class is a human user account. In such case, the model is trained to predict the the probability that an account is a human user account. Moreover, the above method can be applied to classify other types of accounts (e.g., a first type of account and a second type of account) using identity management keys.

In the embodiment described with respect to FIG. 1, the system classifies accounts using just the keys from an identity management system, not the key-value pairs. However, in alternate embodiment, key-value pairs are used to classify accounts. In such case, the statistical model is trained using key-value pairs and predicts the likelihood each key-value pair, or a set of key-value pairs, is a certain type of account.

Figure 4:
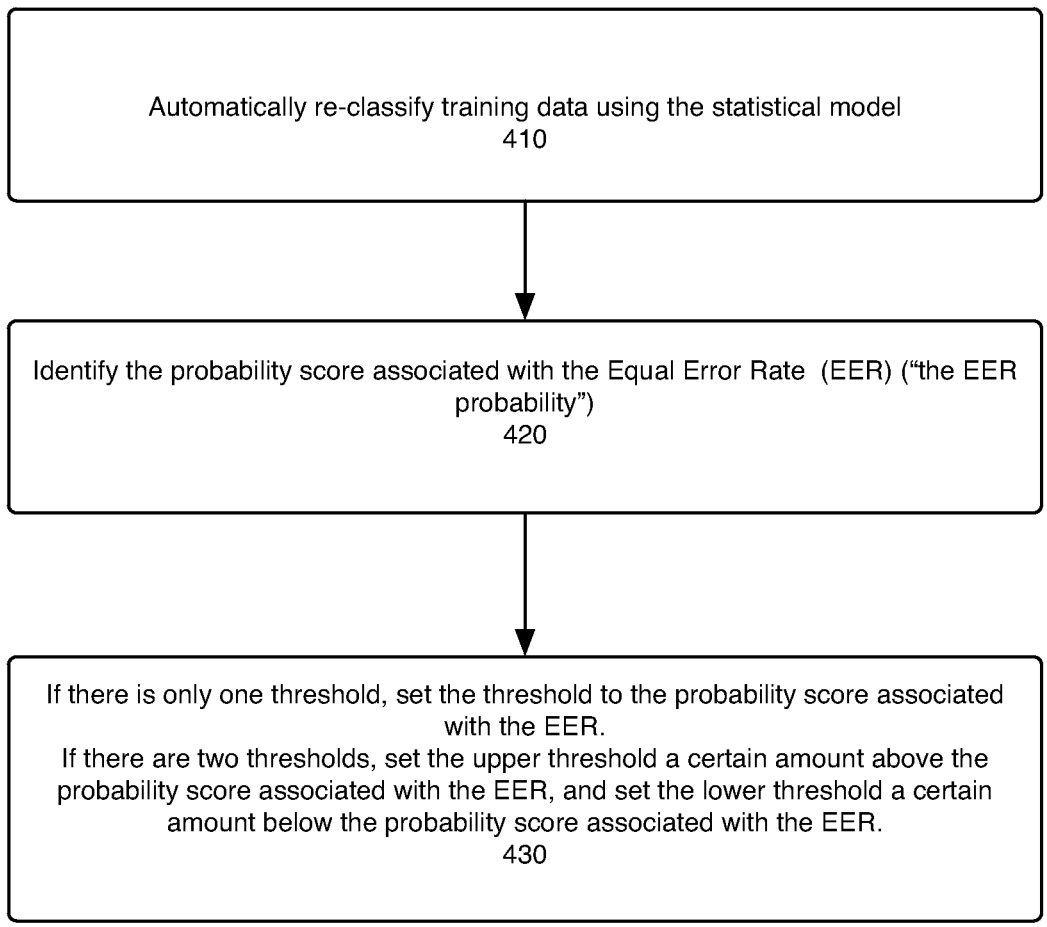
FIG. 4 is a flowchart that illustrates a method, according to one embodiment, for calculating a probability threshold.

FIG. 4 illustrates a method, according to one embodiment, for calculating a probability threshold, such as threshold 210 in FIG. 2. The system performs steps 120-140 on the training data (i.e., the manually-classified accounts used to train the model) to automatically classify the training data accounts (step 410). These counts were previously classified manually to train the model, but in step 410 the system uses the model to automatically reclassify the accounts. The system identifies the probability score at which the false positive (FP) rate is equal to the false negative (FN) rate (step 420). This is known as the Equal Error Rate (EER). The FP rate is the percentage of negative accounts misclassified by the system as positives, assuming that the manual classifications were correct. The FN rate is the percent of positive accounts misclassified by the system as negatives, assuming that the manual classifications were correct.

If the positive scenario is service accounts (i.e., the system predicts the probability that an account is a service account), then the FP rate is the percentage of human user accounts misclassified as service accounts by the system, assuming that the manual classifications were correct. Likewise, the FN rate is the percentage of service accounts misclassified by the system as human user accounts, assuming the manual classifications were correct. If only one threshold will be used by the system to classify accounts (e.g., threshold 210), the threshold probability is the EER probability (step 430). If two thresholds are used (e.g., thresholds 305, 310), the lower threshold is set a certain amount below the EER score, and the upper threshold is set a certain amount above the EER score (step 430). In such case, the lower threshold gives x amount of the FN rate, and the upper threshold gives y amount of the FP rate, wherein x and y are separately controllable based on the EER. For example, assume that, at the EER, the FP and FN rates are 12%. The upper and lower thresholds are set to probability scores on the x axis respectively associated with lower FP and FN rates. The lower threshold might be set to an FN rate of 6% and the upper threshold might be set to a FP rate of 6%. The percentages need not be equal.

Figure 5:
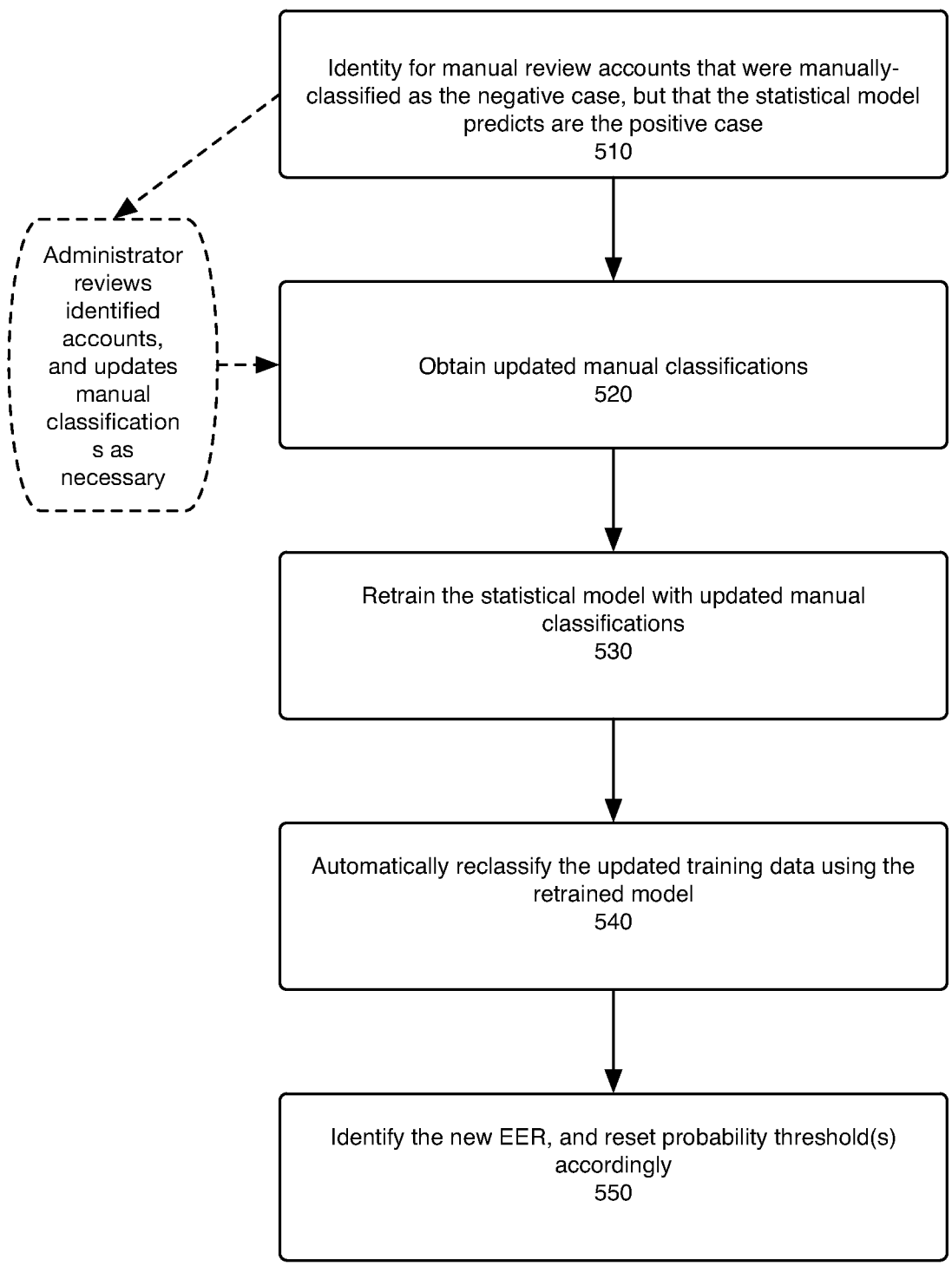
FIG. 5 is a flowchart that illustrates a method, according to one embodiment, for lowering the Equal Error Rate of the classification results.

An iterative classification process may be used to lower the EER rate and increase the accuracy of the statistical model. FIG. 5 illustrates an example of such a process. The system identifies the accounts that were manually-classified as the negative case (e.g., human user accounts), but that the statistical model predicts are the positive case (e.g., service accounts) (step 510). In FIG. 2, these would be the accounts represented by the bars with hash marks 240 that are to the right of threshold 210 (i.e., the accounts that were manually classified as human user accounts, but predicted to be service accounts by the system). An analyst reviews the identified accounts again, and updates the manual classifications as applicable. The system obtains the updated manual classifications and retrains the statistical model (steps 520, 530). The system then inputs the updated training data into the retrained statistical model and reclassifies the training accounts accordingly (step 540). This results in a lower EER rate and higher classification accuracy, while minimizing the amount of accounts that need to be manually reviewed (step 550). The probability threshold(s) are adjusted in accordance with the probability score of the new EER. This process may be repeated iteratively.

The methods described with respect to FIGS. 1-5 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

The account classification results may be used in context-specific rules in security analytics for computer networks. For example, an alert may be raised if an account classified by the methods herein as a human user account is behaving like a service account.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for automatically classifying user accounts in an entity's computer network, wherein the user accounts are classified using keys from an identity management data structure, the method comprising:
   creating a statistical model using Bernoulli Naïve Bayes modeling that maps individual keys or sets of keys to a probability of being associated with a first type of user account;
   training the statistical model using a set of inputs and a target variable;
   parsing account data from an LDIF or other data format stored in or hosted on an identity management system associated with user accounts manually classified as the first type of user account or a second type of user account to obtain dynamically-specified textual keys that are used as the inputs in the statistical model;
   setting the target variable in the statistical model to be whether the user account is the first type of user account;
   using machine-learning-based modeling to automatically determine whether an unclassified user account is the first type of user account by performing the following:
      identifying keys, from the identity management system, associated with the unclassified user account,
      representing the unclassified user account as an N-dimensional vector of the keys, wherein N is the number of the keys associated with the unclassified user account,
      inputting the N-dimensional vector into the statistical model to calculate a probability that the unclassified user account is the first type of user account,
      in response to the probability exceeding a threshold, classifying the unclassified user account as the first type of user account,
      in response to the probability being below a second, lower threshold, classifying the unclassified user account as the second type of user account, and
      in response to the probability being between the threshold and the second, lower threshold, concluding that the classification of the user account is undetermined;
   using machine-learning-based modeling to automatically reclassify the manually-classified user accounts by performing the following:
      identifying keys, from the identity management system, associated with the manually-classified user account,
      representing the manually-classified user account as an N-dimensional vector of the keys, wherein N is the number of the keys associated with the manually-classified user account,
      inputting the N-dimensional vector into the statistical model to calculate a probability that the manually-classified user account is the first type of user account,
      identifying a probability score associated with an equal error rate (EER), wherein the EER is the rate at which false positives equal false negatives,
      setting the threshold to the probability score associated with the EER, and
      in response to the probability exceeding the threshold, classifying the manually-classified user account as the first type of user account;

iteratively performing the following to increase accuracy of the statistical model:
  identifying any mismatches between automatic classifications and manual classifications,
  updating manual classifications,
  retraining the statistical model with the updated manual classifications,
  automatically reclassifying the manually-classified user accounts using the retrained statistical model, and
  identifying a new EER and resetting the threshold to the probability score associated with the new EER;
using account classification results from the machine-learning-based modeling to construct and evaluate context-specific rules; and
using the context-specific rules to improve security analytics alert accuracy in a computer network.

2. The method of claim 1, wherein the first type of user account is a service user account and the second type of user account is a human user account.

3. The method of claim 1, wherein the first type of user account is a human user account and the second type of account is a service user account.

4. The method of claim 1, wherein the keys for the unclassified user account are identified by parsing an output text file from the identity management system that corresponds to the unclassified user account.

5. A non-transitory computer-readable medium comprising a computer program, that, when executed by a computer system, enables the computer system to perform the following method for automatically classifying user accounts in an entity's computer network, wherein the user accounts are classified using keys from an identity management data structure, the method comprising:
  creating a statistical model using Bernoulli Naïve Bayes modeling that maps individual keys or sets of keys to a probability of being associated with a first type of user account;
  training the statistical model using a set of inputs and a target variable;
  parsing account data from an LDIF or other data format stored in or hosted on an identity management system associated with user accounts manually classified as the first type of user account or a second type of user account to obtain dynamically-specified textual keys that are used as the inputs in the statistical model;
  setting the target variable in the statistical model to be whether the user account is the first type of user account;
  using machine-learning-based modeling to automatically determine whether an unclassified user account is the first type of user account by performing the following:
    identifying keys, from the identity management system, associated with the unclassified user account,
    representing the unclassified user account as an N-dimensional vector of the keys, wherein N is the number of the keys associated with the unclassified user account,
    inputting the N-dimensional vector into the statistical model to calculate a probability that the unclassified user account is the first type of user account,
    in response to the probability exceeding a threshold, classifying the unclassified user account as the first type of user account,
    in response to the probability being below a second, lower threshold, classifying the unclassified user account as the second type of user account, and
    in response to the probability being between the threshold and the second, lower threshold, concluding that the classification of the user account is undetermined;
  using machine-learning-based modeling to automatically reclassify the manually-classified user accounts by performing the following:
    identifying keys, from the identity management system, associated with the manually-classified user account,
    representing the manually-classified user account as an N-dimensional vector of the keys, wherein N is the number of the keys associated with the manually-classified user account,
    inputting the N-dimensional vector into the statistical model to calculate a probability that the manually-classified user account is the first type of user account,
    identifying a probability score associated with an equal error rate (EER), wherein the EER is the rate at which false positives equal false negatives, setting the threshold to the probability score associated with the EER, and
    in response to the probability exceeding the threshold, classifying the manually-classified user account as the first type of user account;
  iteratively performing the following to increase accuracy of the statistical model:
    identifying any mismatches between automatic classifications and manual classifications,
    updating manual classifications,
    retraining the statistical model with the updated manual classifications,
    automatically reclassifying the manually-classified user accounts using the retrained statistical model, and
    identifying a new EER and resetting the threshold to the probability score associated with the new EER;
  using account classification results from the machine-learning-based modeling to construct and evaluate context-specific rules; and
  using the context-specific rules to improve security analytics alert accuracy in a computer network.

6. The non-transitory computer-readable medium of claim 5, wherein the first type of user account is a service user account and the second type of user account is a human user account.

7. The non-transitory computer-readable medium of claim 5, wherein the first type of user account is a human user account and the second type of account is a service user account.

8. The non-transitory computer-readable medium of claim 5, wherein the keys for the unclassified user account are identified by parsing an output text file from the identity management system that corresponds to the unclassified user account.

9. A computer system for automatically classifying user accounts in an entity's computer network, wherein the user accounts are classified using keys from an identity management data structure, the system comprising:
  one or more processors;
  one or more memory units coupled to the one or more processors, wherein the one or more memory units store instructions that, when executed by the one or more processors, cause the system to perform the operations of:

creating a statistical model using Bernoulli Naïve Bayes modeling that maps individual keys or sets of keys to a probability of being associated with a first type of user account;

training the statistical model using a set of inputs and a target variable;

parsing account data from an LDIF or other data format stored in or hosted on an identity management system associated with user accounts manually classified as the first type of user account or a second type of user account to obtain dynamically-specified textual keys that are used as the inputs in the statistical model;

setting the target variable in the statistical model to be whether the user account is the first type of user account;

using machine-learning-based modeling to automatically determine whether an unclassified user account is the first type of user account by performing the following:
  identifying keys, from the identity management system, associated with the unclassified user account,
  representing the unclassified user account as an N-dimensional vector of the keys, wherein N is the number of the keys associated with the unclassified user account,
  inputting the N-dimensional vector into the statistical model to calculate a probability that the unclassified user account is the first type of user account,
  in response to the probability exceeding a threshold, classifying the unclassified user account as the first type of user account,
  in response to the probability being below a second, lower threshold, classifying the unclassified user account as the second type of user account, and
  in response to the probability being between the threshold and the second, lower threshold, concluding that the classification of the user account is undetermined;

using machine-learning-based modeling to automatically reclassify the manually-classified user accounts by performing the following:
  identifying keys, from the identity management system, associated with the manually-classified user account,
  representing the manually-classified user account as an N-dimensional vector of the keys, wherein N is the number of the keys associated with the manually-classified user account,
  inputting the N-dimensional vector into the statistical model to calculate a probability that the manually-classified user account is the first type of user account,
  identifying a probability score associated with an equal error rate (EER), wherein the EER is the rate at which false positives equal false negatives,
  setting the threshold to the probability score associated with the EER, and
  in response to the probability exceeding the threshold, classifying the manually-classified user account as the first type of user account;

iteratively performing the following to increase accuracy of the statistical model:
  identifying any mismatches between automatic classifications and manual classifications,
  updating manual classifications,
  retraining the statistical model with the updated manual classifications,
  automatically reclassifying the manually-classified user accounts using the retrained statistical model, and
  identifying a new EER and resetting the threshold to the probability score associated with the new EER;

using account classification results from the machine-learning-based modeling to construct and evaluate context-specific rules; and using the context-specific rules to improve security analytics alert accuracy in a computer network.

10. The system of claim 9, wherein the first type of user account is a service user account and the second type of user account is a human user account.

11. The system of claim 9, wherein the first type of user account is a human user account and the second type of account is a service user account.

12. The system of claim 9, wherein the keys for the unclassified user account are identified by parsing an output text file from the identity management system that corresponds to the unclassified user account.

\* \* \* \* \*